Nov. 15, 1932.   B. F. CONNER ET AL   1,887,994
TOOL FOR REMOVING THREADED ARTICLES FROM A MOLD
Original Filed March 6, 1929
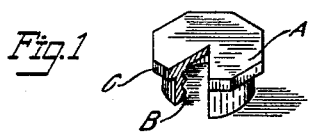
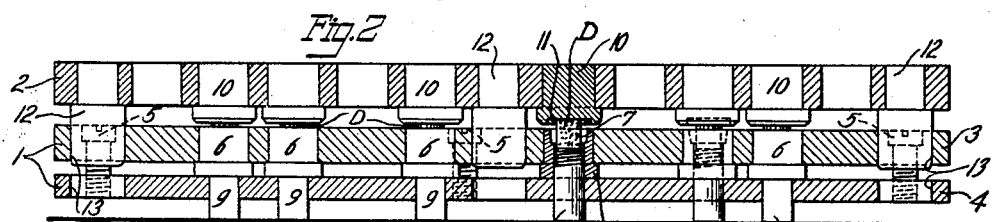
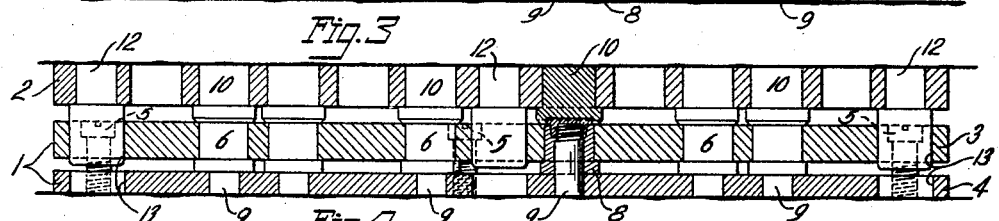
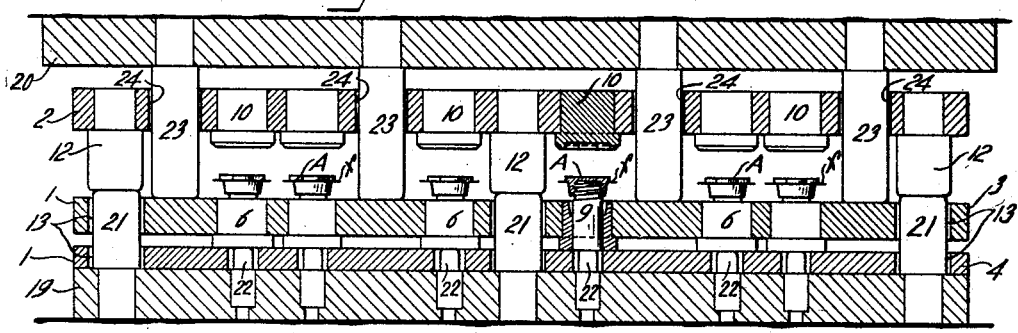
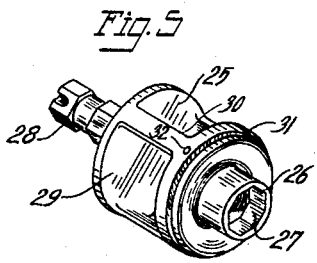
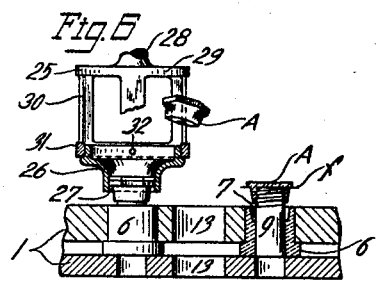
Inventors
Benjamin F. Conner
William F. Schmalz
By S. Jay Teller
Attorney Patented Nov. 15, 1932

1,887,994

UNITED STATES PATENT OFFICE

BENJAMIN F. CONNER, OF HARTFORD, AND WILLIAM F. SCHMALZ, OF ROCKVILLE, CONNECTICUT, ASSIGNORS TO COLT'S PATENT FIRE ARMS MANUFACTURING CO., OF HARTFORD, CONNECTICUT, A CORPORATION OF CONNECTICUT

TOOL FOR REMOVING THREADED ARTICLES FROM A MOLD

Original application filed March 6, 1929, Serial No. 344,746. Divided and this application filed July 28, 1931. Serial No. 553,570.

A tool embodying the present invention is particularly adapted for use with a mold such as shown in our copending application for molding apparatus and method of molding for interiorly threaded articles, Serial No. 344,746 filed March 6, 1929, of which this present application is a division.

The principal object of the present invention is to provide a simple and convenient tool which can be used for unscrewing the completed articles from the threaded core pins of the mold in rapid succession and with a minimum of effort on the part of the operative.

In the accompanying drawing we have shown one embodiment of the invention which we now deem preferable, but it will be understood that the drawing is intended for illustrative purposes only and is not to be relied upon as defining or limiting the scope of the invention, the claims forming a part of this specification being relied upon for that purpose.

Of the drawing:

Fig. 1 is a perspective view of a tube cap of the type with which a tool embodying the present invention is adapted to be used.

Figs. 2, 3 and 4 are transverse sectional views of a mold and auxiliary parts therefor with which a tool embodying the invention is adapted to be used.

Fig. 5 is a perspective view of the tool.

Fig. 6 is a fragmentary transverse sectional view showing the tool in operative relationship with a tube cap and with a portion of the mold.

Fig. 1 shows a tube cap A of the type with which a tool embodying the invention is particularly adapted to be used. It will be noted that the cap A is closed at its upper end and is open at the other end, and that it is provided adjacent the open end with interior threads B adapted to engage the exterior threads at the end of a collapsible tube. Preferably the cap has a peripheral flange C adjacent the top face which facilitates the screwing and unscrewing of the cap onto and from the threaded neck of the tube. It will, of course, be understood that the invention is in no way limited as concerns the details of the size and shape of the cap.

Fig. 2 shows in section a mold adapted to be used for molding caps such as the cap A. This view shows only the mold proper without auxiliary parts, this mold comprising two main separable sections 1 and 2. For convenience the sections 1 and 2 will be referred to as lower and upper sections respectively.

The two mold sections 1 and 2 are so formed that they serve, when in operative relationship, to provide a plurality of mold recesses shaped to determine the exterior contours of the tube caps or other articles to be molded. As shown the mold sections are constructed so that the tube caps are molded in upright positions with their closed ends at the top. The lower section 1 is shaped to determine a part of the exterior contour of the cap adjacent the lower open end thereof; and the upper section 2 has a recess shaped to determine the exterior contour of the said article at the closed end thereof and at least in part at the sides thereof. When the cap is provided with a peripheral flange C adjacent the top as is here shown, the exterior contour of the lower part of the cap below the flange is preferably determined by the lower mold section 1 and the exterior contour of the cap at the top and at the periphery of the flange is preferably determined by the recess in the upper mold section 2.

For the sake of convenience of construction the lower section 1 is formed with two separate plates 3 and 4 suitably connected by means of screws 5, 5. Seated in apertures in the upper plate 3 are plugs 6, 6 each formed with a recess 7 therein forming a part of the corresponding mold recess and being shaped to determine the exterior contour of the lower part of the tube cap. The said exterior contours are such as to permit upward withdrawal of the completed caps from the recesses while all of the parts of the lower section remain in fixed relation to each other. Each of the plugs 6 is provided with an enlarged bottom portion 8 which forms an upper shoulder determining the position of the plug with respect to the plate 3. The lower ends of the plugs are engaged by the plates 4 and the screws 5, 5 serve to clamp the plugs in place.

For each mold recess the lower mold section is provided with an exteriorly threaded core pin 9 shaped to determine the threaded interior contour of the cap. Each of the plugs 6 is provided with a central vertical hole extending into the mold recess 7 thereof and the plate 4 is provided with corresponding holes registering with the respective holes in the plugs. Positioned in the said holes in the plugs 6 and in the plate 4 are the said core pins 9 which are shaped as already described. The pins 9 are preferably longitudinally movable in their respective holes and preferably the said pins are initially positioned as shown in Fig. 2 so as not to project into the mold recesses. Preferably and as shown the holes in the plugs extend to the lower face of the mold and the core pins 9 initially project at their lower ends. Initially the several pins serve to support the entire mold as shown.

The upper mold section 2 is provided with plugs 10, 10 corresponding in number and in location to the plugs 6, 6 in the lower mold section 1. These plugs 10 are formed with mold recesses 11 adapted to determine the upper portion of the exterior contour of the tube caps to be molded. In order that the two mold sections 1 and 2 may be held in proper register with each other the said upper section 2 is provided with dowel pins 12, 12 which project into holes 13, 13 in the lower section 1.

The moldable material is preferably formed into pellets or briquettes D, D so that suitably measured quantities of the said material may be conveniently available for loading into the several mold recesses. When the briquettes D, D have been put in place in the recesses of the lower mold section, either by means of a suitable loading fixture (not shown) or otherwise, the upper mold section 2 is put in place as shown in Fig. 2. The two mold sections 1 and 2 initially assume substantially their closed relationship although they may be held slightly separated as shown by reason of their engagement with the briquettes D, D. As already stated the core pins 9, 9 project at the bottom and these may serve to initially support the entire mold.

The mold is then placed in a heated press of any usual or preferred type having a lower bed plate and an upper platen, and pressure is applied in the usual way as indicated in Fig. 3. This pressure serves not only to firmly engage the two main mold sections 1 and 2 with each other but it also serves to move the core pins 9, 9 longitudinally into the mold recesses 7, 11 thus forming and determining the interior contours of the caps which are being molded. The pins 9, 9 in moving into the mold recesses accomplish two results, one being the determination of the interior contour as already mentioned and the other being the application to the plastic material of the pressure which is required for proper molding. The mold parts are allowed to remain in their molding positions for the time which is required for the proper curing of the molded material.

After the conclusion of the molding and curing operation the mold proper is assembled with two auxiliary plates 19 and 20 which are shown in Fig. 4. The lower plate 19 has upwardly projecting pins 21, 21 adapted to enter the holes 13, 13 in the lower mold section 1 and it preferably also has a plurality of pins 22, 22 adapted to engage the lower ends of the several core pins 9, 9. The upper auxiliary plate 20 has downward projecting pins 23, 23 which are positioned to extend through holes 24, 24 in the upper mold section 2. The closed mold is placed on the lower auxiliary plate 19 with the pins 21, 21 extending into the holes 13, 13 and engaging the lower ends of the dowel pins 12, 12, and with the pins 22, 22 vertically below the core pins 9, 9. The upper auxiliary plate 20 is put in place with the pins 23, 23 entering the holes 24, 24 and engaging at their lower ends with the top surface of the bottom mold section 1. The entire assemblage is placed in a press and pressure is applied with the result that the parts are moved to the relative positions shown in Fig. 4. The pins 21, 21 engage the pins 12, 12 to push the upper mold section 2 upward and at the same time the pins 23, 23 engage the lower mold section 1 to push it downward. This relative downward movement of the lower mold section 1 causes the core pins 9, 9 to be moved additionally in the relatively upward direction by reason of their engagement with the pins 22, 22 on the plate 19. The said core pins assume the relative positions shown in Fig. 4 with the result that the finished tube caps A, A are ejected from their initial positions, that is, their initial positions in the lower mold recesses, but remain in place on the upper ends of the core pins. It will be observed that the ejection of the caps A, A separates the overflow or flashes *f*, *f* thereof from both mold sections as clearly shown.

After the parts have been moved to the relative positions shown in Fig. 4 the upper auxiliary plate 20 and the upper mold section 2 are removed, and, as indicated in Fig. 6, the lower mold section 1 may be placed on a suitable table or support for the more ready removal of the caps A, A which are now held solely by the core pins 9. For convenience the bottom mold section 1 may be placed in an inclined position, although it is not so shown.

In accordance with the invention we make use of a rotatable tool 25 which serves not only to unscrew the finished molded caps A, A from the core pins 9, 9, but which also serves to break off and remove the overflows or flashes $f$, $f$ therefrom. The tool 25 is shown in Figs. 5 and 6, this tool having a head 26 with an opening 27 therein of such size and shape as to enable the head to closely fit over the exterior portion of the molded cap. It will be understood that the tool 25 or at least the head portion thereof must be constructed to fit the particular size and style of cap or other article which is being molded. Connected with the head is an actuating means therefor, this means being provided with an unobstructed space above the head to receive the caps or other articles passing through the hole in the head and being further provided with at least one unobstructed lateral opening communicating with the said space. As shown the said actuating means is provided with a stem 28 which is coaxial with the head 26 and is connected with a flange 29 located opposite the head. The head and the flange are connected by means of spaced spider arms 30, the spaces between the arms constituting the said unobstructed lateral openings and being of sufficient size to permit the completed molded articles to pass through. The tool 25 may be provided with a handle whereby it may be turned manually, or it may be connected at the stem 28 with a suitable pneumatic, electric or other power rotating means. For convenience in changing the head 26 to fit different caps, there is provided a ring 31 formed integrally with the arms 30, and the head 26 is detachably connected with the ring 31 by means of pins 32.

It will be observed that the minimum dimensions of the space within the head and of each lateral opening therein are considerably greater than the maximum diameter of the article receiving hole in the head, so that each article passing through the said hole may freely enter the space in any relative position and may then pass freely outward through any one of the openings between the arms 30. The entry of the articles into the large space above the heads is facilitated by the shape of the hole in the head. The sides of the said hole are parallel near the bottom thereof and diverge near the top thereof. This construction makes it possible for each article as soon as it is unscrewed to move freely upward and outward without being subject to any close restriction by any part of the tool. The articles are not forced to travel through any narrow passageway or duct wherein they might become lodged or jammed.

In operation the tool 25 is placed over the completed molded body or cap A as shown at the left in Fig. 6. Inasmuch as the hole in the head is of approximately the same size and shape as the exterior contour of the cap, the head serves to break off and remove the flash so that very little if any subsequent cleaning of the cap is required. When the tool 25 is connected with a power means, as is preferred, it is continuously rotating and the unscrewing of the cap A takes place substantially simultaneously with the removal of the flash. Inasmuch as tube caps and the like ordinarily have but two or three threads, the unscrewing is effected almost instantaneously and the rotating tool 25 can be quickly transferred from one cap to another so that all of the caps made in a multiple mold can be cleaned and unscrewed in very rapid succession. By reason of the fact that the tool 25 is open at the upper side of the head 26, the caps A, A as they are successively cleaned and unscrewed, can pass through the head 26 and can then be discharged outward between the arms 30 of the spider into a suitable receptacle (not shown) placed to receive them.

What we claim is:

1. In a tool for the purpose described, the combination of a rotatable head having a central hole therethrough shaped to receive and approximately fit the articles to be engaged, and a rigidly connected rotatable actuating means including a stem above the head and coaxial therewith, which actuating means has therein an unobstructed space above the head and at least one unobstructed lateral opening communicating with the said space, the minimum dimensions of the space and of the opening being considerably greater than the maximum diameter of the article receiving hole so that each article passing through the hole may freely enter the space in any relative position and may then pass freely outward through the opening.

2. A tool as set forth in the claim 3, wherein the sides of the article receiving hole are parallel near the bottom thereof and diverge near the top thereof.

3. In a tool for the purpose described, the combination of a rotatable head having a central hole therethrough shaped to receive and approximately fit the articles to be engaged, and a rotatable actuating means including a stem above the head and coaxial therewith and also including a plurality of arms rigidly connecting the stem with the head, the said arms being spaced apart to provide an unobstructed space above the head and to provide a plurality of unobstructed lateral openings communicating with the said space, the minimum dimensions of the space and of the openings being considerably greater than the maximum diameter of the article receiving hole so that each article passing through the hole may freely enter the space in any relative position and may then pass freely outward through any one of the openings.

4. The combination in a tool for the purpose described, of a rotatable head having a central hole therethrough shaped to receive and approximately fit the articles to be engaged, and a rotatable actuating means detachably connected with the head and including a stem above the head and coaxial therewith, the said actuating means having therein an unobstructed space above the head and having at least one unobstructed lateral opening communicating with the said space, and the minimum dimensions of the space and of the opening being considerably greater than the maximum diameter of the article receiving hole so that each article passing through the hole may freely enter the space in any relative position and may then pass freely outward through the opening.

5. The combination in a tool for the purpose described, of a rotatable spider comprising a central stem, a ring spaced downward from the stem and coaxial therewith and a plurality of arms rigidly connecting the stem with the ring, the said arms being spaced apart to provide an unobstructed space between the ring and the stem and to provide a plurality of unobstructed lateral openings communicating with the space, and a rotatable head detachably connected with the ring and having a central hole therethrough shaped to receive and approximately fit the articles to be engaged, the maximum diameter of the said hole being such that the articles passing therethrough may freely enter the said space and may then pass freely outward through any one of the said openings.

In testimony whereof we have hereunto set our hands this 20th day of July, 1931.

BENJAMIN F. CONNER.
WILLIAM F. SCHMALZ.

CERTIFICATE OF CORRECTION.

Patent No. 1,887,994.   November 15, 1932.

BENJAMIN F. CONNER ET AL.

It is hereby certified that error appears in the printed specification of the above numbered patent requiring correction as follows: Page 3, line 107, claim 2, for the claim number "3" read "1"; and that the said Letters Patent should be read with this correction therein that the same may conform to the record of the case in the Patent Office.

Signed and sealed this 17th day of January, A. D. 1933.

(Seal)

M. J. Moore,
Acting Commissioner of Patents.